Jan. 28, 1969  A. J. JOHNSON III  3,424,853
SHIELDED CONNECTION OF THIN WALLED CONDUITS
Filed June 10, 1966
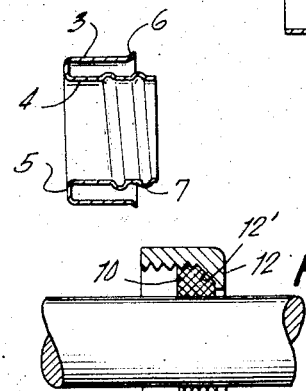
FIG. 2
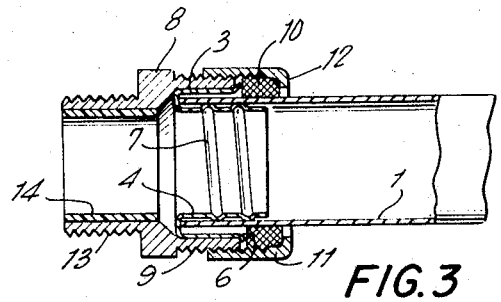
FIG. 1
FIG. 8
FIG. 3
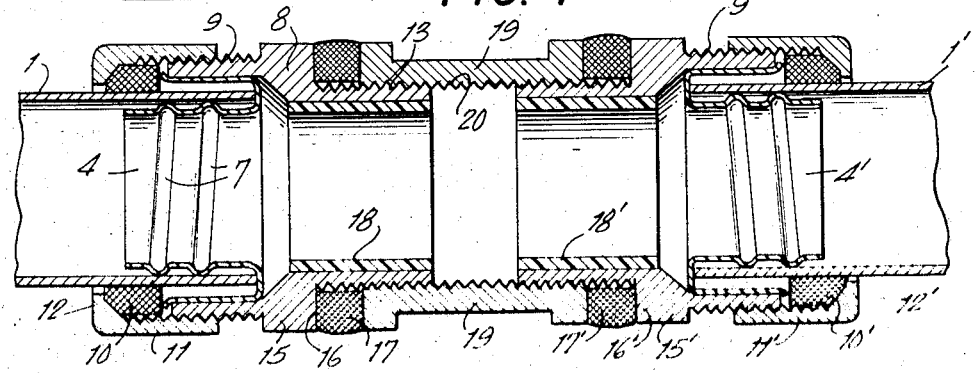
FIG. 4
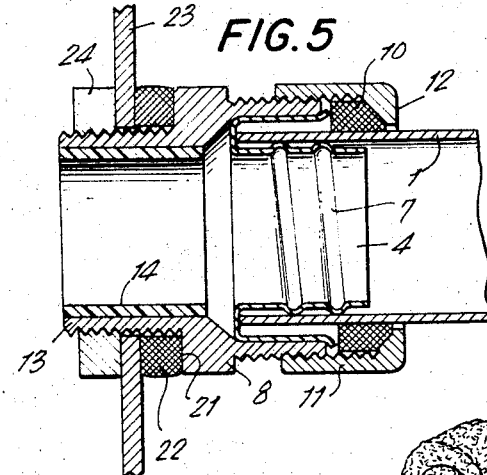
FIG. 5
FIG. 6
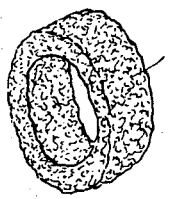
FIG. 7
INVENTOR.
ARTHUR J. JOHNSON, III
BY
Bierman & Bierman
ATTORNEYS United States Patent Office 3,424,853
Patented Jan. 28, 1969

3,424,853
SHIELDED CONNECTION OF THIN
WALLED CONDUITS
Arthur J. Johnson III, 32 Prescott Ave.,
Montclair, N.J. 07042
Filed June 10, 1966, Ser. No. 556,669
U.S. Cl. 174—35               11 Claims
Int. Cl. H05k 9/00

The present invention is directed to shielding electro-magnetic radiation in unions and connectors for thin wall conduit or electro-magnetic tubing (E.M.T.), and more particularly where such thin wall conduit enters or leaves shielded raceways, metal housing containing electronic equipment and metal compartments in which electronic equipment is located.

It is well known in the electronic industry that where the thin wall conduit (E.M.T.) carries conductors for power cables, there will occur electro-magnetic radiation leakage where sections of the thin wall conduit are connected, so as to be continuous, or where the thin wall conduit enters a metal compartment or box or housing containing electronic equipment. This electro-magnetic leakage will cause considerable disturbance in the neighborhood or vicinity to communication equipment and, in some instances, to other delicate operative electronic equipment.

Where the thin wall conduit (E.T.M.) carries cables for communications, it is most essential that the unions or connectors, which join the sections of thin wall conduit and where they enter metal containers or housings, be shielded so as to prevent the ingress or egress of electro-magnetic radiation to prevent its detrimental effect on electronic equipment in the vicinity or otherwise.

For economic and other practical reasons, there has been somewhat recently developed what is known as a thin wall conduit (E.M.T.) in which electronic or other wiring can be installed. Due to the thickness of the wall of this conduit, it would be impractical or costly to thread the ends so that a conventional coupling for joining the conduit in continuous runs could be used. As a result of the impracticability of threading, and in order to get good shielding of electro-magnetic radiation, it would be necessary to weld or solder the joints of sections of the thin wall conduit or weld or solder where the conduit enters a metal container.

In view of the difficulties and disadvantages of the prior art, it is among the objects of the present invention to provide a structure which will give excellent shielding of electro-magnetic radiation, without the necessity of either soldering or welding operations.

It is also among the objects of the present invention to provide a device which eliminates the necessity or advisability of threading the conduit which has an extremely thin wall.

It is further among the objects of the invention to provide a novel and unique structure of simple character and having a high degree of effectiveness and obtaining adequate shielding of such radiation.

The invention is more fully described in connection with the accompanying drawing, constituting a part hereof and in which like reference characters indicate like parts, and in which FIG. 1 is a longitudinal cross-sectional view of a fragmentary portion of a conduit, such as is used in the industry;

FIG. 2 is a cross-sectional view of a grounding adapter which constitutes one of the essential elements of the invention;

FIG. 3 is a longitudinal cross-sectional view of the complete assembly of elements;

FIG. 4 is a somewhat enlarged view in longitudinal cross-section of a modified form of the invention;

FIG. 5 is a view similar to FIG. 3 showing the use of the invention in conjunction with a lead-in;

FIG. 6 is a similar view of a modified form of the invention;

FIG. 7 is a perspective view of the knitted mesh gasket; and

FIG. 8 is a fragmentary cross-sectional view of a detail.

Referring to FIGS. 1 to 3, the thin conduit 1 having a squared end 2 leads into the union. The adapter consists of a double tube, the outer tube 3 and inner tube 4, being joined by base 5 and having a U-shape in cross-section. Tube 3 has an outwardly extending lip or flange and tube 4 has one or more protuberances 7, extending outwardly therefrom. The body 8 of the union has a hexagonal outer surface for the application of a wrench or other tool.

The larger end thereof is threaded externally at 9. The mesh gasket 10 abuts against lip 6 and is held tightly against conduit 1 by application of threaded cap or set screw 11. An inturned flange 12 thereon confines gasket 10 and insures good electrical contact between all of the adjacent metallic elements. The opposite end of body 8 is threaded externally at 13 for the reception of any suitable device and it has an insulating lining 14, the diameter of which is approximately the same diameter of tube 4.

In FIG. 4, there is shown a device for uniting two of the devices shown in FIGS. 1-3. At the left hand side thereof, body 8 has a portion 15 formed with a shoulder 16. Mesh gasket 17 of suitable metal abuts against shoulder 16. An insulating lining 18 is provided in body 8. Sleeve 19 is threaded internally at 20 and meshes with threads 13 of body 8. The left-hand side of FIG. 4 is substantially identical with the right-hand side and the reference characters used thereon, are similar thereto.

Referring to FIG. 5, body 8 has shoulder 21 against which the metal mesh gasket 22 abuts. The left-hand side of body 8 is inserted through wall 23 of a container or other structure in which electro-magnetic equipment is placed. Gasket 22 abuts against one face of wall 23 and a nut 24 threaded on the body compresses gasket 22 until close contact has been obtained.

FIG. 6 shows a structure which is quite similar to that of FIG. 3, but which the double-tube adapter shown separately on FIG. 2, is replaced by an adapter integral with body 8. As shown thereon, a series of projections inwardly from body 8, form close contact with the end of conduit 1, under the compression of cap or nut 11. Thus, excellent electrical contact is obtained throughout the structure.

The material used in gasket 10 is of metal and usually of a fine wire. It may be formed into the proper shape usually by knitting, but other methods of forming such an elastic metal gasket may be used, such as weaving, matting or any other suitable process.

It can readily be seen that one or more types of standard couplings could be used for numerous sizes of conduit, provided there is sufficient or suitable space for the knitted mesh compressed shielding ring to be placed as in FIG. 3. In other words, the ID of the union is always larger than the OD of the conduit. By providing a suitable adaptor as shown in FIG. 2, one or more standard types of unions could be used, within reason, for several diameters of thin wall conduit.

Where the thin wall conduit (E.M.T.) enters or leaves a container as shown in FIG. 5, it can be seen that welding or soldering would not be necessary as a shielding gasket could be inserted between the flange of the union and the wall of the container. When the lock nut is brought tight on the opposite side, it will compress to gasket so as to prevent leaks of electro-magnetic radiation at this entrance point.

An important feature of the invention is shown in detail in FIG. 8. On the inside of cap 11 at flange 12 is a taper 12'. There is also a corresponding taper on mesh gasket 10. The inside diameter of the knitted mesh ring fits snugly the outside diameter of the thin wall conduit (E.M.T.). Now when the union is drawn up in a conventional manner, the end of the male part of the union compresses the knitted mesh unit 10 against taper 12' and when this lateral pressure is applied on the ring, it causes a vertical compression on the knitted mesh ring which makes it snug or hug the thin wall conduit very tightly which gives an excellent grounding shield for preventing electromagnetic radiation at the area where the thin wall conduit is joined.

What is claimed is:

1. An electromagnetic radiation shield joint for thin walled conduits comprising a tubular body, one end of said body being threaded externally, a deformable grounding adaptor consisting of a double tube joined together at one end and being substantially U-shaped in cross-section, said adaptor being held centrally within said body, a rigid thin walled conduit the end of which is fitted into said adaptor, a metal mesh gasket surrounding said conduit and contacting the outer of said double tube, and means engaging said external threads for clamping said adaptor to provide a conductive path between said conduit and said body.

2. A radiation shield according to claim 1 characterized in that said gasket is a knitted fabric.

3. A radiation shield according to claim 1 characterized in that the diameter of said body at said one externally threaded end is greater than the diameter at the other end.

4. A radiation shield according to claim 1 characterized in that the free edge of the outer member of said double tube is flanged outwardly, said flange contacting the adjacent end of said body.

5. A radiation shield according to claim 1 characterized in that the length of the inner of said double tube is longer than the outer tube.

6. A radiation shield according to claim 1 characterized in that the inner of said double tube has outwardly extending ribs.

7. A radiation shield according to claim 1 characterized in that said means being a nut threaded onto said external threads.

8. A radiation shield according to claim 1 characterized in that the end of said engaging means has an inturned flange bearing against said gasket.

9. A radiation shield according to claim 1 characterized in that said adaptor has a plurality of inwardly projecting ribs from said threaded end of said body and contacting the end of said conduit on its outer surface.

10. A radiation shield according to claim 1 characterized in that a cylindrical sleeve is interposed between two of the units of claim 1, said sleeve being joined to said units by threaded connections.

11. A radiation shield according to claim 1 characterized in that said gasket is a knitted fabric, the diameter of said body at said one externally threaded end is greater than the diameter at the other end, the free edge of the outer member of said double tube is flanged outwardly, said flange contacting the adjacent end of said body, the length of the inner of said double tube is longer than the outer tube, the inner of said double tube extending ribs, said means being a nut threaded onto said external threads, the end of said engaging means has an inturned flange bearing against said gasket, said adaptor is a plurality of inwardly projecting ribs from said threaded end of said body and contacting the end of said conduit on its outer surface, and a cylindrical sleeve is interposed between two of the units of claim 1, said sleeve being joined to said units by threaded connections.

References Cited

UNITED STATES PATENTS

| 988,911 | 4/1911 | Terry | 151—14 XR |
| 1,933,555 | 11/1933 | Jasper | 174—87 |
| 3,006,664 | 10/1961 | Appleton et al. | 285—248 |
| 3,154,632 | 10/1964 | Browne | 174—86 |

DARRELL L. CLAY, *Primary Examiner.*

U.S. Cl. X.R.

174—65, 78, 84; 285—248